United States Patent [19]

Lundberg et al.

[11] 4,343,859

[45] Aug. 10, 1982

[54] FIBERS OF IONIC POLYMERS

[75] Inventors: Robert D. Lundberg, Bridgewater; Henry S. Makowski, Scotch Plains, both of N.J.

[73] Assignee: Exxon Research & Engineering Co., Florham Park, N.J.

[21] Appl. No.: 179,997

[22] Filed: Aug. 21, 1980

Related U.S. Application Data

[63] Continuation of Ser. No. 17,543, Mar. 5, 1979, abandoned, which is a continuation-in-part of Ser. No. 855,730, Nov. 29, 1977, abandoned.

[51] Int. Cl.$^3$ .............................................. D02G 3/00
[52] U.S. Cl. ........................... 428/364; 260/DIG. 23; 428/372; 428/379
[58] Field of Search ...................... 428/364, 372, 379; 260/29.7 B, 36.6 AQ, 33.8 R, 28.5 B, 31.2 R, 42.33, 42.47, DIG. 23, DIG. 31, 42.46, 42.43

[56] References Cited

U.S. PATENT DOCUMENTS

| | | | |
|---|---|---|---|
| 2,245,310 | 6/1941 | Waterman | 260/DIG. 23 |
| 3,642,728 | 2/1972 | Canter | 260/DIG. 23 |
| 3,974,240 | 8/1976 | Bock et al. | 260/23.5 A |
| 3,974,241 | 8/1976 | Lundberg et al. | 260/28.5 R |
| 4,158,653 | 6/1979 | Chung | 260/42.47 |

*Primary Examiner*—Lorraine T. Kendell
*Attorney, Agent, or Firm*—Richard E. Nanfeldt

[57] ABSTRACT

The present invention relates to an improved process for forming elastomeric fibers for elastic yarn from neutralized sulfonated elastomeric polymers, and novel elastomeric fiber compositions derived therefrom, wherein the neutralized sulfonated elastomeric polymer is dissolved in a mixed solvent consisting of a backbone solvent and a polar cosolvent and spun into fibers. The neutralized sulfonated elastomeric polymer has about 10 to about 50 meq. sulfonate groups per 100 grams of sulfonated elastomeric polymer, of which at least 95% are neutralized with a cation being selected from the group consisting of antimony, iron, lead, aluminum, and Groups I-A, II-A, IB and II-B of the Periodic Table of Elements and mixtures thereof. The solution of the neutralized sulfonated elastomeric polymer having a Brookfield viscosity at room temperature at about 6 rpm of about 1,000 to about 200,000 cps is fabricated into fibers by wet or dry spinning through a spinner having a plurality of orifices therein. The resultant elastomeric fibers exhibit improved dimensional stability, and resistance to solvents and superior holding power, when fabricated into an elastomeric yarn.

8 Claims, No Drawings

FIBERS OF IONIC POLYMERS

CROSS-REFERENCE TO RELATED APPLICATIONS

This is a continuation, of application Ser. No. 17543, filed Mar. 5, 1979, now abandoned, which in turn is a continuation-in-part of Ser. No. 855,730 filed Nov. 29, 1977, now abandoned.

FIELD OF THE INVENTION

The present invention relates to novel elastomeric fibers and an improved process for forming elastomeric fibers for elastic yarn from neutralized sulfonated elastomeric polymers, wherein the neutralized sulfonated elastomeric polymer is dissolved in a mixed solvent consisting of a backbone solvent and a polar cosolvent and spun into fibers. The neutralized sulfonated elastomeric polymer has about 10 to about 50 meq. sulfonate groups per 100 grams of sulfonated elastomeric polymer, of which at least 95% being neutralized with a cation being selected from the group consisting of antimony, iron, lead, aluminum, and Groups I-A, II-A, I-B and II-B of the Periodic Table of Elements and mixtures thereof. The solution of the neutralized sulfonated elastomeric polymer having a Brookfield viscosity at room temperature at 6 rpm of about 1,000 to about 200,000 cps is fabricated into fibers by wet or dry spinning through a spinner having a plurality of orifices therein. The resultant elastomeric fibers exhibit improved dimensional stability, and resistance to solvents and superior holding power, when fabricated into an elastomeric yarn.

BACKGROUND OF THE INVENTION

A major growing industry over the past decade has been the employment of synthetic elastomeric fibers in the manufacture of elastomeric yarns. Elastomeric yarns are used primarily in foundation garments, swim suits, and support hoisery. The primary function of the elastic yarn in these applications is to exert back-stress, when stretched wherein the back-stress is called holding power. A satisfactory elastomeric yarn must retain its holding power over long periods of extension and after repeated extension and relaxation. The properties of the elastomeric yarn should not significantly deteriorate in fabric dying or on repeated laundering. The discoloration under UV or sunlight should also be minimal.

A polyurethane resin, Spandex, manufactured by E. I. DuPont de Nemours and Co., represents the major synthetic elastomeric polymer being employed in the manufacturing of elastomeric yarns. Spandex is wet or dry spun into fibers by dissolving the Spandex in a relatively high cost solvent such as dimethyl acetamide or dimethyl formamide. The compositions of the present invention employ less costly mixed solvent systems such as a mixture of xylene and methanol. Furthermore, the raw material cost of Spandex can be several fold that of the raw material of the compositions of the present invention. Additionally, the compositions of the present invention exhibit improved versatility in a spinning operation as compared to Spandex. Recently, a new class of sulfonated elastomeric polymers has been described in a number of U.S. Pat. Nos. 3,642,728; 3,836,511; 3,870,841 and 3,847,854 herein incorporated by reference. These types of sulfonated elastomeric polymers constitute the general class of the compositions of the present instant invention. The aforementioned patents fail to clearly recognize or even imply the use of these types of polymers in a solution form for the manufacture of improved elastomeric fibers, but rather teach compositions of matter useful primarily in hot melt extrusion or molding type processes.

SUMMARY OF THE INVENTION

The present invention relates to the surprising discovery that unique and novel sulfonated elastomeric polymer fibers capable of high performance can be formed by an improved process.

The resultant fibers of the sulfonated elastomeric polymers have improved dimensional stability and improved resistance to a broader class of solvents as compared to commercially available elastomeric fibers such as Spandex.

The improved process for the manufacturing of these sulfonated elastomeric polymer fibers results in a substantial reduction in manufacturing cost which is realized due to decrease in solvent cost as well as improved processability parameters during the fiber spinning operation as compared to the cost involved in the manufacture of Spandex fibers.

The elastomeric polymer of the instant invention can be readily reprocessed thereby substantially reducing production cost through the recycling of the scrap which heretofore has been difficult in the manufacturing of Spandex fibers.

The sulfonated elastomeric polymer of the instant invention can be readily formed into elastomeric fibers on conventional designed fiber forming equipment.

GENERAL DESCRIPTION

This present invention relates to unique and novel sulfonated elastomeric polymer fibers which are readily formable on conventionally designed fiber forming equipment by an improved process into high performance elastomeric fibers having superior dimensional stability, improved holding power, and good chemical resistance to a broad class of solvents.

The elastomeric polymers of the present invention are derived from synthetic and natural polymers having olefinic unsaturation sites, wherein the polymer has from about 0.1 to about 10 mole percent olefinic unsaturation, and preferably from about 0.2 to about 4 mole percent unsaturation. The unsaturation sites can be in the polymer backbone, pendant therefrom or cyclic, except that aromatic containing polymers are excluded from this description. In particular, the unsaturated polymers of this present instant invention include low unsaturated elastomeric polymers such as Butyl rubber or EPDM terpolymers. Alternatively, other unsaturated polymers are selected from the group consisting of partially hydrogenated polyisoprenes, partially hydrogenated polybutadienes, isobutylene copolymers, Neoprene, and styrene-butadiene copolymers.

The expression "Butyl rubber" as employed in the specification and claims is intended to include copolymers made from a polymerization reacted mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin. Butyl rubber generally has a Staudinger molecular weight of about 20,000 to about 500,000, preferably about 25,000 to about 400,000 especially about 100,000 to about 400,000, and a Wijs Iodine No. of about 0.5 to 50, preferably 1 to 15. The preparation of Butyl rubber is described in U.S. Pat. No. 2,356,128 which is incorporated herein by reference. For the purposes of this invention, the Butyl rubber may have incorporated therein from about 0.2 to 10% of combined multiolefin; preferably about 0.5 to about 6%; more preferably about 1 to about 4%, e.g. 2%. Illustrative of such a Butyl rubber is Exxon Butyl 268 (Exxon Chemical Co.), having a mole percent unsaturation of about 2.0% and a Mooney viscosity (ML, 1+3, 260° F.) of about 50–60. Low molecular weight Butyl rubbers, i.e. Butyl rubbers having a viscosity average molecular weight of about 5,000 to 85,000 and a mole percent unsaturation of about 3 to about 4% may be sulfonated by the process of this invention. Preferably, these polymers have a viscosity average molecular weight of about 25,000 to about 60,000.

The EPDM terpolymers are low unsaturated polymers having about 1 to about 10.0 weight percent olefinic unsaturation, more preferably about 2 to about 8, most preferably about 3 to 7 defined according to the definition as found in ASTM-D-1418-64 and is intended to mean terpolymers containing ethylene and propylene in the backbone and a diene which provides for unsaturation in a side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 75 weight percent ethylene and about 1 to about 10 weight percent of a diene monomer, the balance of the polymer being propylene. Preferably, the polymer contains about 45 to about 70 weight percent ethylene, e.g. 50 weight percent and about 2.6 to about 6.0 weight percent diene monomer, e.g. 5.0 weight percent. The diene monomer is preferably a nonconjugated diene. Illustrative of these nonconjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene. A typical EPDM is Vistalon 2504 (Exxon Chemical Co.), a terpolymer having a Mooney viscosity (ML, 1+8, 212° F.) of about 40, and having an ethylene content of about 50 weight percent and a 5-ethylidene-2-norbornene content of about 5.0 weight percent. The $\overline{M}n$ as measured by GPC of Vistalon 2504 is about 47,000, the $\overline{M}v$ as measured by GPC is about 145,000 and the $\overline{M}w$ as measured by GPC is about 174,000. Another EPDM terpolymer V-2504-20 is derived from V-2504 (Exxon Chemical Co.) by a controlled extrusion process, wherein the resultant Mooney viscosity (ML, 1+8, 212° F.) is about 20. The $\overline{M}n$ as measured by GPC of V-2504-20 is about 26,000, the $\overline{M}v$ as measured by GPC is about 90,000 and the $\overline{M}w$ as measured by GPC is about 125,000. Nordel 1320 (DuPont) is another terpolymer having a Mooney viscosity (ML, 1+8, 212° F.) of about 25 and having about 53 weight percent of ethylene and about 3.5 weight percent of 1,4-hexadiene. The EPDM terpolymers of this invention have a number average molecular weight ($\overline{M}n$) as measured by GPC of about 10,000 to about 200,000, more preferably of about 15,000 to about 100,000, most preferably of about 20,000 to about 60,000. The Mooney viscosity of the EPDM terpolymer (ML, 1+8, 212° F.) is about 5 to about 60, more preferably about 10 to about 50, most preferably about 15 to about 40. The $\overline{M}v$ as measured by GPC of the EPDM terpolymer is preferably below about 350,000 and more preferably below about 300,000. The $\overline{M}w$ as measured by GPC of the EPDM terpolymer is preferably below about 500,000 and more preferably below about 350,000. The elastomeric polymer is dissolved in a non-reactive solvent such as a chlorinated aromatic hydrocarbon, a cycloaliphatic hydrocarbon, an aliphatic hydrocarbon or a chlorinated aliphatic hydrocarbon such as chlorobenzene, cyclohexane, pentane, isopentane, cyclopentane, hexane, isohexane or heptane, methylene chloride or dichloroethane. The preferred solvents are aliphatic hydrocarbons. The solution of the elastomeric polymer and non-reactive solvent is contacted with a sulfonating agent at a temperature of about $-100°$ C. to about $100°$ C. for a period of time of about 1 to about 60 minutes, more preferably at room temperature for about 5 to about 45 minutes, and most preferably about 15 to about 30. Typically sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. Typical sulfur trioxide donors are $SO_3$, chlorosulfonic acid, fluorosulfonic acid, etc. Typical Lewis bases are: dioxane, tetrahydrofuran, triethylphosphate, or tetrahydrothiophene. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a solvent or neat. A preferred acyl sulfate is acetyl sulfate.

It should be pointed out that neither the sulfonating agent nor the manner of sulfonation is critical, provided that the sulfonating method does not degrade or covalently crosslink the polymer backbone. The reaction is quenched with an aliphatic alcohol being selected from methanol, ethanol, n-propanol or isopropanol, with an aromatic hydroxyl compound such as phenol, with a cycloaliphatic alcohol such as a cyclohexanol or with water. The sulfonated EPDM terpolymer has about 10 to about 60 meq. sulfonate groups per 100 grams of polymer, more preferably about 15 to about 50, and most preferably about 20 to about 40. The meq. of sulfonate groups/100 grams of polymer is determined by both titration of the sulfonated elastomeric polymer and Dietert Sulfur analysis. In the titration of the sulfonated elastomeric polymer, the sulfonated elastomeric polymer is dissolved in solvent consisting of 95 parts of toluene and 5 parts of methanol at a concentration level of 50 grams per liter of solvent. The sulfonated elastomeric polymer is titrated with ethanolic sodium hydroxide to an Alizarin Thymolphthalein endpoint.

The unneutralized sulfonated elastomeric polymer is substantially gel-free (i.e. less than 5 weight percent of the total polymer is insoluble) and hydrolytically stable. Percent is gel measured by stirring a given weight of polymer in a solvent comprised of 95 toluene-5-methanol at a concentration of 50 g/liter for 24 hours, allowing the mixture to settle, withdrawing a weighed sample of the supernatant solution and evaporating to dryness. Hydrolytically stable means that the acid function, in this case the unneutralized sulfonate, will not be eliminated under neutral or slightly basic conditions to a neutral moiety which is incapable of being converted to a highly ionic functionality.

Neutralization of the unneutralized sulfonated elastomeric polymer is done by the addition of a solution of a basic salt to the unneutralized sulfonated elastomeric polymer dissolved in the mixture of the aliphatic alcohol and non-reactive solvent. The basic salt is dissolved in water, in an aliphatic alcohol, or in a binary solvent system consisting of water and an aliphatic alcohol. The counterion of the basic salt is selected from antimony, iron, aluminum, lead and Groups I-A, II-A, I-B and II-B of the Periodic Table of Elements, ammonium and amine derivatives and mixtures thereof. The preferred cations are zinc, magnesium, barium, sodium, potassium, calcium and lead. The anion of the basic salt is selected from a carboxylic acid having from about 1 to about 4 carbon atoms, a carbonate, a hydroxide, or an alkoxide, and mixtures thereof. It is preferable to neutralize at least 95% of the sulfonate groups, more preferably about 98%, most preferably 100%. Useful examples of metal hydroxides are NaOH, KOH, LiOH, $Mg(OH)_2$ and $Ba(OH)_2$. The preferred neutralization agents are metal acetates and ammonium acetates. The most peferred neutralizing agent is zinc acetate. The neutralization of the sulfonate groups of the sulfonated elastomeric polymers with an organic amine is also satisfactory due to the formation of weak ionic bonds thereby resulting in fibers having a different balance of physical properties. They can be employed in the instant invention to prepare elastomeric fibers possessing different attributes.

A means of characterizing the apparent molecular weight of a polymer involves the use of melt rheological measurements. For ionic polymers, this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this application, the relationship will be assumed to be one of direct proportionality. Thus, in comparing two materials, which are otherwise similar in composition, the one with the higher melt viscosity will be associated with the higher apparent molecular weight.

The melt viscosities of the systems described above can be determined by the use of an Instron Capiliary Rheometer. Generally, because of the high viscosities encountered, the melt viscosity measurements are made at a temperature of 200° C. and at various shear rates corresponding to crosshead speeds from 0.005 in/min to 20 in/min. The apparent viscosity at 200° C. and at a shear rate of 0.73 $sec^{-1}$ (0.005 in/min) can be employed as a characterization parameter. A measure of the melt elasticity of a given system can also be obtained from these rheological measurements. A type of flow instability known as melt fracture is exhibited by many polymeric materials of high molecular weight. This phenomonon is shear sensitive and thus will generally exhibit itself at a given shear rate and temperature. The shear rate for the onset of melt fracture indicates the upper shear rate for processing a given material. This shear rate is used as a characterization parameter for compounds employed in extrusion processing.

The resultant neutralized sulfonated terpolymer has a viscosity at 0.73 $sec^{-1}$ at 200° C. of at least about $5 \times 10^4$ poise, more preferably of at least about $1 \times 10^5$ poise and more preferably at least about $2 \times 10^5$ poise. Higher viscosity sulfonated elastomers can be employed, however, the solutions prepared therefrom will have substantially higher solution viscosities.

The neutralized sulfonate containing polymers at the higher sulfonate levels possess extremely high melt viscosities and are thereby difficult to melt process. The addition of ionic group plasticizers markedly reduces melt viscosity and frequently enhances physical properties.

These preferential plasticizers are selected from the group consisting of carboxylic acid having about 5 to about 30 carbon atoms, more preferably about 8 to about 22 carbon atoms, and basic salts of these carboxylic acids wherein the metal ion of the basic salt is selected from the group consisting of aluminum, iron, antimony, lead and Groups I-A, II-A, I-B and II-B of the Periodic Table of Elements and mixtures thereof. The carboxylic acids are selected from the group consisting of lauric, myristic, palimitic, or stearic acids and mixtures thereof. Examples of basic salts of these carboxylic acids include zinc stearate, magnesium stearate or zinc laurate.

The preferential plasticizer is incorporated into the neutralized sulfonated EPDM terpolymer at about 1 to about 60 parts by weight per 100 parts by weight of the neutralized sulfonated elastomeric polymer, more preferably at about 7 to about 40, and most preferably at about 10 to about 25. The metallic salt of the carboxylic acid can also be used as neutralizing agent. In the case of the neutralizing agent and plasticizer being the identical chemical species, additional metallic salt of the carboxylic acid is added over the required levels of neutralization. Alternatively, other preferential plasticizers are selected from ureas, thioureas, amines, amides such as stearamide, ammonium and amine salts of carboxylic acids and mixtures thereof. The preferred plasticizers are selected from carboxylic acids having 8 to 22 carbon atoms or metallic salts of these carboxylic acids and mixtures thereof. The resultant neutralized sulfonated elastomeric polymer with preferential plasticizer is isolated from the solution by conventional steam stripping and filtration.

The isolated dried crumb of the neutralized sulfonated elastomeric polymer, which can be also plasticized, is dissolved in a mixed solvent to form a solution for the subsequent process of forming the fibers. The concentration of the neutralized sulfonated elastomeric polymer in the solution is about 5 to about 50 grams per hundred ml. of the mixed solvent, more preferably about 10 to about 25, and most preferably about 15 to about 25, wherein the resultant Brookfield viscosities of the solutions at 6 rpm at room temperature is about 1,000 to about 200,000 cps, more preferably about 2,000 to about 50,000, and most preferably about 5,000 to about 25,000. The mixed solvent is formed from a backbone solvent which solvates the backbone of the sulfonated elastomeric polymer and a polar cosolvent (or simply polar solvent) which solvates the ionic acid groups of the sulfonated elastomeric polymer, wherein the backbone and polar cosolvents should be mutually miscible with each other. The backbone solvent is selected from aromatic, aliphatic or cycloaliphatic type solvents such as toluene, benzene, or xylene, heptane, decane, hexane, etc. and mixtures thereof. The polar cosolvent is selected from the group consisting of aliphatic and cycloaliphatic alcohols, such as methanol, ethanol, isopropanol, n-propanol, n-butanol, isobutanol, pentanol, isopentanol, isohexanol, n-hexanol, methyl cyclohexanol or cyclohexanol and mixtures thereof. Selected amines and other polar solvents can also be employed and the general class of such solvents is described in U.S. Pat. No. 3,931,021, herein incorporated by reference. The selection of these respective solvents and their relative amounts is an important aspect of this improved process for preparing the fibers. The first solvent which comprises the major portion of the polymer solution is one which primarily solvates the polymer backbone and therefore can be termed the backbone solvent. It is a requirement that the polymer backbone prior to sulfonation be soluble in the backbone solvent. Solubility is determined by dissolution of 1 gram of polymer in 100 ml. of solvent. If 95% or more of the polymer dissolves, the polymer is deemed to be soluble in that solvent. For example, if 1 gram of EPDM is tested for solubility in toluene, it is observed that the polymer substantially dissolves, therefore, toluene represents an acceptable solvent for this polymer. Upon sulfonation and neutralization, it is generally observed that the sulfonated, neutralized polymer will not dissolve in a hydrocarbon solvent or mixture of such solvents or if dissolution occurs the solution viscosities will be so high at the desired polymer level that the polymer solutions are extremely difficult to handle.

We have observed that the addition of a suitable polar cosolvent will permit the dissolution of these sulfonated, neutralized polymers to yield solutions which are substantially gel free and which possess solution viscosities in a very desirable range for spinning fibers. Furthermore, such solutions can contain high solids levels, for example, up to and exceeding 15 weight percent Sulfo EPDM which is extremely desirable in such spinning operations.

It is apparent that the type and level of the polar solvent is very important in the practice of this invention. First, it must contain a suitable polar function such as an alcohol, ester, acid, amine or similar polar group. Second, this polar solvent must interact primarily with the ionic groups of the sulfonated polymer so as to dissociate them to a substantial extent. Third, this polar solvent must be miscible with the backbone solvent at the levels employed in the spinning process, i.e., it should not comprise a second phase which is immiscible with the primary solvent. This latter requirement can be established simply by adding the candidate polar solvent to the backbone solvent at the desired level and determining that the solvent pair is indeed miscible.

The amount of polar cosolvent required depends on the amount of polymer to be dissolved, its sulfonate content, the choice of backbone solvent employed, and on the structure of the polar solvent. Generally, the polar solvent will be present at levels ranging from about one weight percent (based on the combined weights of polar cosolvent and backbone solvent) to about 30 weight percent, preferably from about 3 percent to about 20 percent and most preferably from about 4 percent to about 15 percent.

An excellent solvent combination is a combination of xylene and methanol with the former being a backbone solvent and the latter the polar solvent. If insufficient methanol is added, the neutralized sulfonated polymer will not dissolve. If too much methanol is incorporated then it can act as a precipitant for the polymer backbone. Therefore, for example, a 50/50 xylene/methanol combination should not be employed because in the case of Sulfo EPDM it will not form a true solution in this mixture. On the other hand, the use of other alcohols such as hexanol-1 permits their incorporation at a relatively higher level because they are more compatible with the polymer backbone.

Methanol is a highly preferred polar cosolvent because it interacts very strongly with the ionic groups and serves to decrease polymer solution viscosity most effectively even when present at low levels. Also, it is inexpensive and readily available. Other alcohols such as ethanol and isopropanol are also preferred polar solvents.

Even the combination of a backbone solvent and a preferred polar solvent may not be an acceptable solvent combination. For example, the selection of hexane and methanol is not a desirable pair because of the limited miscibility of methanol with hexane. Alternatively, the use of hexanol-hexane or isopropanol-hexane provides very acceptable combinations. Therefore, those skilled in the art, who follow these teachings, can readily determine the appropriate solvent mixtures that meet the requirements delineated above. Specific working examples will be provided below.

Additionally, various additives can be incorporated into the compositions for modification of various properties, wherein the additives are selected from the group consisting of lubricants, a metallic hydroxide, fillers, oils, pigments or stabilizers. If the additive is a liquid, it can be ideally added to the cement of the neutralized sulfonated elastomeric polymer prior to isolation by steam stripping. If the additive is a solid, it can be added to a crumb of the sulfonated elastomeric polymer by compound in an intensive mixing device such as Banbury, a Farrell Continuous Mixer, a compounding extruder, or on a two-roll mill. Explicitly excluded from the additives which can be added to the neutralized sulfonated elastomeric polymers are polyolefinic thermoplastic resins which, even at low levels of addition, have an adverse effect on the elasticity of the resultant fibers. Typical polyolefinic resins which are explicitly excluded are polyethylene and polypropylene. For example, a filler can be incorporated into the composition for modification of the modulus of the fiber as well as altering the surface shine. The fillers employed in the present invention are selected from the group consisting of talcs, ground calcium carbonate, water precipitated calcium carbonate, or delaminated, calcined or hydrated clays and mixtures thereof. These fillers are incorporated into the blend composition at about 1 to about 50 parts by weight per 100 parts by weight of the neutralized sulfonated elastomeric polymer, more preferably at about 1 to about 25, and most preferably at about 2 to about 10. These fillers must be selected so as to be properly suspended in the polymer solution prior to spinning the elastomeric fibers. Therefore, the particle size must be such that the particles do not readily settle out during the solution spinning process. Therefore, the preferred filler size is from about 0.03 to about 10 microns. Some typical fillers are shown in Table I.

TABLE I

| Filler | Code # | Oil Absorption grams of oil/100 grams of filler | Specific Gravity | Avg. Particle Size Micron | pH |
|---|---|---|---|---|---|
| calcium carbonate ground | Atomite | 15 | 2.71 | | 9.3 |
| calcium carbonate precipitated | Purecal U | 35 | 2.65 | .03–.04 | 9.3 |
| delaminated clay | Polyfil DL | 30 | 2.61 | 4.5 | 6.5–7.5 |
| hydrated clay | Suprex | | 2.6 | 2 | 4.0 |
| calcined clay | Icecup K | 50–55 | 2.63 | 1 | 5.0–6.0 |
| magnesium silicate (talc) | Mistron Vapor | 60–70 | 2.75 | 2 | 9.0–7.5 |

The oils employed in the present invention modify the fiber and impart a rubbery-like feel, wherein the oils are non-polar process oils having less than about 2 weight percent polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 s.s.u.'s at 100° F. and a number average molecular weight of about 300 to about 1000, and more preferably about 300 to 750. The preferred process oils are paraffinics. Table II illustrates typical oils encompassed by the scope of this invention.

The oils are incorporated into the blend composition at a concentration level of about 1 to about 60 parts by weight per 100 parts by weight of the neutralized sulfonated elastomeric polymer, more preferably at about 1 to about 40 and most preferably at about 1 to about 25.

TABLE II

| Type Oil | Oil Code # | Viscosity s.s.u. | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 5C5 | — | 0.9 | 20.8 | 78.3 |

A lubricant can be employed in the blend composition at a concentration level of about 1 to about 20 parts per 100 parts by weight of the neutralized sulfonated elastomeric polymers, and more preferably about 1 to about 15. The lubricants of the present instant invention are non-polar paraffinic hydrocarbon waxes having a softening point of about 135° F., to about 220° F., more preferably 150° F. to 200° F., wherein the wax has a number average molecular weight of about 1000 to about 4000, more preferably 1500 to 3500, and less than about 2 weight percent polar constituents. These internal, external lubricants modify the rheological properties of the composition, improve the processability in forming the elastomeric article and impart a shine or gloss to the elastomeric article. Additionally, amorphous polypropylene can be used as a lubricant. These lubricants can be useful but are not essential to the solution spinning procedure employed.

Zinc oxide can be incorporated into the composition as a whitening pigment as well as a means for improving the ionic bonding force between the sulfonate groups in the sulfonated elastomeric polymer. The zinc oxide is incorporated into the composition at a concentration level of about 1 to about 10 parts by weight per 100 parts by weight of neutralized sulfonated polymer, more preferably about 1 to about 5. Alternatively, a Rutile or Anatase titanium dioxide can be employed as a whitening pigment.

The solution of the neutralized sulfonated elastomeric polymer are extruded through a suitable fiber forming die into the resultant fiber by either a conventional wet spinning or dry spinning method. The dry spinning process is preferred. For example, the solution is fed through a spinner having a plurality of orifices which is submerged in a water coagulating bath. The formed fibers after passing through the water bath are passed to a rubber glass godet, through a heated glycerine stretch-batch, over a draw godet and onto a Winder. Alternatively, in the dry process, the spun fibers extruding from the spinner can flow vertically downwardly through heated air and be collected on a Winder.

EXAMPLE I

The preparation of a suitable sulfonated EPDM was effected by: dissolution of 200 g. of an EPDM (V-2504 from Exxon Chemical Corp. with a Mooney viscosity of about 40 measured at 212° F.) in 4000 ml. of chlorobenzene. A 1.0 molar acetyl sulfate solution in chlorobenzene was generated through the addition of concentrated sulfuric acid to acetic anhydride in chlorobenzene at below 10° C. at an acetic anhydride/$H_2SO_4$ molar ratio of 4.0. When the EPDM was dissolved 80 ml. of 1.0 molar acetyl sulfate in chlorobenzene (80 mmoles) was added and the sulfonation reaction conducted at a temperature of 25° to 30° C. After 30 minutes any further reaction was terminated by the addition of about 80 ml. of methanol containing about 1.0 g of Antioxidant 2246. The polymer solution was then neutralized with magnesium stearate at a level of 16 parts of magnesium stearate per 100 g of EPDM. The polymer was then isolated by steam stripping and dried overnight in a vacuum oven. The resulting polymer was found by sulfur analysis to contain 0.89 weight percent sulfur.

EXAMPLE II

This example describes the dissolution of the polymer sample from Example I in a suitable mixed solvent, the solution spinning of elastomeric fibers and the properties of the resulting fibers.

A. Procedures

1. Preparation of Solutions For Spinning

Solutions were prepared by dissolving the isolated sulfonated polymer in a 95:5 mixture of xylene and methanol (by volume). Sealed glass jars containing solvent and polymer were placed in a water bath at 37° C., shaken for 18 hours and then deaerated by placing the polymer and open container in a vacuum desiccator and applying a vacuum with a water aspirator. Solutions containing 8 to 15% of polymer were prepared.

2. Dry Spinning a. Preliminary Experiments

Preliminary experiments to determine the feasibility of dry-spinning fibers of this experimental polymer and to produce short lengths of filaments for study were made as follows: a sample of polymer solution was prepared as described above and fibers were formed by immersing the end of a glass rod in the solution and then slowly lifting the rod into air at room temperature for about 3 feet to form a fiber between the rod and solution. These fibers were immediately attached to metal rods about 3 feet apart on a ring stand. The ring stand with fibers was then placed in an air-circulating oven and the remaining solvent was removed by heating the fibers to 150° C.

b. Pilot-Scale Dry Spinning

Polymer solutions were dry spun in a 16-foot dry-spinning tower. The polymer solution was charged to a small stainless-steel reservoir (125 ml.) fitted with a spinneret, and the solution was forced through the spinneret by applying nitrogen pressure to the reservoir. Two spinnerets had a single orifice 10 mils in diameter. A 250-mesh stainless-steel screen was located in the spinneret holder against the back surface of the spinneret. The filaments passed from the spinneret located at the top of the tower through the 16-foot tower to a surface driver about 5 feet below the base of the tower.

3. Measurement of Fiber Properties a. Denier

The denier of the fibers was determined by weighing a 90-cm length on an analytical balance and calculating the weight in grams of 9,000 m.

b. Tensile Properties

The tensile properties of the fibers were determined from measurements made on a Model TMS Instron Tester following the general procedures outlined in ASTM Method D-2731-68T "Elastic Properties of Elastomeric Yarns" and in DuPont's Technical Information Bulletin L-17 dated January, 1965. The gauge length was 2 inches, the crosshead speed was 20 in/min, and the chart speed was 20 in/min.

4. Preliminary Spinning Trials

A preliminary dry spinning experiment was made with a solution containing about 15% by weight of the sample described in Example I (Sample I-A). Fibers were formed in this experiment by simply immersing the end of a spatula in the solution and then slowly drawing it away in air at room temperature to form a filament about 3 feet long. Filaments were easily formed by this procedure and dried sufficiently in air at room temperature to allow handling.

The fibers formed by the above procedure were elongated about 50% and then mounted by attaching them with tape to metal rods spaced about 3 feet apart on a ring stand. The rack with fibers was then placed in an air-circulating oven where the fibers were heated from 25° C. to 150° C. over a 45-minute period. The mounted fibers were then recovered from the oven and allowed to cool under tension. The tensile properties of fibers formed by this procedure are given below in Table III.

TABLE III

| TENSILE PROPERTIES OF FIBERS OF SAMPLE I-A | |
|---|---|
| Properties | Sample I-A |
| Filament denier | 225 |
| Tenacity, g/d | 0.52 |
| Elongation at break, % | 840 |
| Stress decay, %, at | |
| 100% extension | 21 |
| Holding power, g/d, at | |
| 100% extension | 0.028 |
| 200% extension | 0.033 |
| Set at 100% extension, % | 3.9 |

5. Pilot-Scale Dry-Spinning Experiment

Monofilaments were dry spun from two solutions containing about 9% and about 10% of the polymer of Example I dissolved in an xylene-methanol mixture. These solutions (about 5,000 and 14,000 cps viscosity, respectively) were dry spun from a 125-ml spinning pot fitted with a spinneret having a single 12-mil orifice. Monofilament (Sample I-B) spun from the solution having a viscosity of about 5,000 cps was spun through the tower with an air temperature of 240° C. and collected at a take-up rate of 62 ft/min. The monofilament (Sample I-C) spun from the solution having a viscosity of about 14,000 cps was spun through the tower with an air temperature of 230° C. and collected at a take-up rate of 118 ft/min. The nitrogen pressure to the spinning pot was about 40 psig in both experiments. No spin finish was applied to the monofilament in either experiment. The properties of the monofilaments are reported in Table IV. No difficulties were encountered in these spinning runs.

TABLE IV

| PROPERTIES OF MONOFILAMENT OF SULFONATED ELASTOMERIC POLYMER PREPARED IN PILOT EQUIPMENT | | | |
|---|---|---|---|
| | Fiber Samples | | |
| Properties | I-A | I-B | I-C |
| Filament denier | 225 | 190 | 55 |
| Tenacity, g/d | 0.52 | 0.44 | 0.55 |
| Elongation at break, % | 840 | 908 | 715 |
| Stress decay, %, at | | | |
| 50% extension | — | 10 | — |
| 100% extension | 21 | 19 | — |
| 200% extension | — | 21 | — |
| Holding power, g/d, at | | | |
| 100% extension | 0.058 | — | — |
| 200% extension | 0.10 | — | — |
| Set at 100% extension, % | 3.9 | — | — |
| Boil-off Shrinkage, % | — | 9.5 | — |

EXAMPLE III

Neutralized sulfonated EPDM terpolymers having either 30 or 40 meq. SO$_3$H/100 g polymer groups were prepared according to the method described in Example I from Vistalon 2504, wherein the acid form of the sulfonated polymers were neutralized with the following neutralizing agents as listed in Table V, wherein the neutralized sulfonated EPDM terpolymers were subsequently isolated from the cement by steam stripping and drying. In neutralization of the polymer by a metal stearate, stearic acid is liberated and retained with the polymer where it can act as a plasticizer. It is expected that the amount of stearic acid liberated will be equivalent to the amount of sulfonic acid present and is indicated as "estimated amount". With the neutralization agent, such as metal acetates, the evolved acetic acid is removed in the workup.

TABLE V

| Sample | SO3H Content Meq/100 g Polymer | Meq. of Neutralizing Agent | Type of Neutralizing Agent | Meq. of* Plasticizer | Type of Plasticizer |
|---|---|---|---|---|---|
| A | 30 | 60 | Magnesium stearate | 30 | Stearic Acid |
| B | 40 | 80 | Magnesium stearate | 40 | Stearic Acid |
| C | 30 | 60 | Magnesium acetate | none | none |
| D | 30 | 60 | Barium acetate | none | none |
| E | 40 | 80 | Magnesium stearate | 40 | Stearic Acid |

*Estimated amounts

EXAMPLE IV

Solutions of the four neutralized sulfonated EPDM terpolymers III-A-D were made by dissolving each of them in three different mixed solvent systems which were formed from xylene and methanol at volume percent ratios of 92/8;93.5/6.5 and 95/5 at a concentration of 10 grams of terpolymer per 100 ml. of mixed solvent. The resultant Brookfield viscosities for the five neutralized sulfonated EPDM terpolymers in the three solvent systems are listed in Table VI.

TABLE VI
VISCOSITY AND APPEARANCE OF SOLUTIONS

| Sample | Xylene/methanol ratio, vol % | Viscosity, cps | Appearance of Solution |
|---|---|---|---|
| A | 92/8$^a$ | 4,000 | Slightly yellow |
|   | 93.5/6.5 | 2,000 | Slightly yellow |
|   | 95/5 | 1,500 | Slightly yellow |
| B | 92/8 | 6,000 | Murky |
|   | 93.5/6.5 | 5,000 | Murky |
|   | 95/5$^a$ | 7,000 | Slightly yellow |
| C | 92/8 | 3,000 | Slightly yellow |
|   | 93.5/6.5$^a$ | 3,000 | Slightly yellow |
|   | 95/5 | 3,000 | Slightly yellow |
| D | 92/8$^a$ | 10,000 | Slightly yellow |
|   | 93.5/6.5 | 14,000 | Murky |
|   | 95/5 | >180,000 | Murky |

EXAMPLE V

Based on the solution viscosities of Example IV and the appearance of the solutions, one solution of each composition of Example I (A-D) was dry spun into fibers by charging each solution into a 500 ml. stainless-steel feed reservoir and forcing the solution by nitrogen pressure to a Zenith metering pump (0.29 cm$^3$/rer.) From the pump, the solution was forced through a screen pack (40/250/40) and then through a spinner having 12 orifices, wherein each orifice had a diameter of 15.6 mils. The filaments passed from the spinner located near the top of the tower through a 16 foot tower to a surface driven Winder located 5 feet below the base of the tower.

The fibers made from compositions A–D of Example III were tested for tenacity, g/d; elongation at break, %; tensile factor; secant modulus g/d; and stress decay, %, wherein the results are summarized in Table VII.

TABLE VII
TENSILE PROPERTIES OF FIBERS

|  | III-A | III-B | III-C | III-D |
|---|---|---|---|---|
| Xylene/methanol, vol. % | 92/8 | 95/5 | 93.5/6.5 | 92/8 |
| Brookfield viscosity, cps | 4,000 | 7,000 | 3,000 | 10,000 |
| Filament denier, relaxed | 150 | 157 | 105 | 129 |
| Tenacity, g/d | 0.25 | 0.41 | 0.15 | 0.12 |
| Elongation at break, % | 750 | 742 | 797 | 733 |
| Tensile factor | 9.1 | 15.0 | 5.3 | 4.4 |
| Secant modulus, g/d at | | | | |

TABLE VII-continued
TENSILE PROPERTIES OF FIBERS

|  | III-A | III-B | III-C | III-D |
|---|---|---|---|---|
| 100% elongation | 0.025 | 0.036 | 0.020 | 0.018 |
| 200% elongation | 0.019 | 0.024 | 0.015 | 0.014 |
| 300% elongation | 0.017 | 0.023 | 0.015 | 0.013 |
| Stress decay (%) at | | | | |
| 300% elongation | 23 | 26 | 17 | 21 |

EXAMPLE VI

A solution of the neutralized sulfonated EPDM terpolymer (V-E) was made by dissolving the sulfonated terpolymer in a mixed solvent of xylene/methanol 95/5 vol. % at a concentration level of 10 grams of terpolymer per 100 ml. of mixed solvent. The Brookfield viscosity at room temperature at rpm's for V-E was 2,500 cps.

The solution was divided into three portions of 100 ml. each. One portion was retained as a control (VI-A). Magnesium hydroxide was added to the other two portions. For sample VI-B, 0.1% magnesium hydroxide based on the weight of the terpolymer was added. For sample VI-C, 0.2% magnesium hydroxide based on the weight of the terpolymer was added. The solutions of VI-B and VI-C were shaken overnight and allowed to stand for 48 hours. The three solutions were then formed into fibers by extruding through a hypodermic styrene into air at room temperature and slowly drawing the formed fiber away from the needle. These fibers were immediately attached to vertically aligned metal rods about 3 feet apart from each other and dried in an air circulating oven at 150° C. Table VIII summarizes the results of the effect of the magnesium hydroxide on the tensile properties of the fibers.

TABLE VIII
EFFECT OF Mg(OH)$_2$ ON TENSILE PROPERTIES OF FIBERS

|  | VI-A | VI-B | VI-C |
|---|---|---|---|
| Mg(OH)$_2$ concentration on polymer, % | 0 | 0.1 | 0.2 |
| Brookfield viscosity, cps | 3,000 | 2,650 | 2,050 |
| Denier | 97.5 | 108 | 120 |
| Tenacity, g/d | 0.35 | 0.35 | 0.29 |
| Elongation at break, % | 600 | 620 | 430 |

The effect of the magnesium hydroxide is to react to some degree with the stearic acid plasticizer and thereby give a somewhat tighter ionic crosslink as shown in the 3rd sample where the elongation is reduced to 430%. This is one approach which can be employed to alter the stress-strain characteristics of these fibers.

It is emphasized in this application that the solution viscosities of the mixed solvent-ionic polymer solutions cover a range of 1000 to 200,000 centipoises when measured at room temperature. Obviously, these viscosity values for a given polymer solution can be altered simply by changing the temperature of the solution. Therefore, it is intended that this range of solution viscosities for acceptable spinning solutions apply from about 0° C. up to about 200° C. Using a higher temperature for spinning these solutions will normally (not always) result in a lower solution viscosity and thereby permit acceptable spinning behavior even when the solution viscosity is not in the preferred range at room temperature. Often it may not be desirable to employ too hot a temperature for the spinning operation due to solvent volatility and therefore a preferred range is from about 25° C. to about 150° C. depending on the system. Adjustment of temperature, polymer concentration, solvent system and other conditions are readily effected by one skilled in the art.

Since many modifications and variations of this invention may be made without departing from the spirit or scope of the invention thereof, it is not intended to limit the spirit or scope thereof to the specific examples thereof.

What is claimed is:

1. An elastomeric fiber having a tenacity of at least about 0.12 grams/denier, which consisting essentially of a sulfonated elastomeric Butyl Rubber or EPDM terpolymer having about 10 to about 50 meq. sulfonate groups per 100 grams of said sulfonated elastomeric polymer, said sulfonate groups being neutralized with an amine, ammonia, quanadine, or a metal counterion being selected from the group consisting of antimony, lead, aluminum, iron and Groups I-A, II-A, I-B and II-B of the Periodic Table of Elements and mixtures thereof, said fiber not containing any polyolefinic resin.

2. A fiber according to claim 1, wherein neutralized sulfonated elastomeric polymer is said EPDM terpolymer having a Mooney viscosity of about 5 to about 60.

3. A fiber according to claim 1, wherein said neutralized sulfonated elastomeric polymer is a Butyl rubber.

4. A fiber according to claim 1, wherein said sulfonate groups are completely neutralized.

5. A fiber according to claim 1, further including an ionic plasticizer at a concentration level of at least about 3 parts by weight per 100 parts by weight of said neutralized sulfonated elastomeric polymer.

6. A fiber according to claim 1, further including an additive at a concentration level of less than about 60 parts by weight based on 100 parts by weight of said neutralized sulfonated elastomeric polymer, said additive is selected from the group consisting of oils, waxes, fillers, pigments, a metallic hydroxide and stabilizers and mixtures thereof.

7. A fiber according to claim 1, further including an ionic plasticizer at a concentration of at least about 10 parts by weight per 100 parts by weight of said neutralized sulfonated elastomeric polymer.

8. A fiber according to claim 1, wherein said cation is selected from the group consisting of zinc, magnesium, barium, sodium and calcium.

* * * * *